Jan. 24, 1956     E. A. MUTH ET AL     2,731,997

COMBINED BAG AND FLAT CLOTH ARTICLE

Filed Sept. 8, 1952     2 Sheets-Sheet 1

INVENTORS
Esther Aldean Muth
BY Beatrice J. Mills

Jan. 24, 1956   E. A. MUTH ET AL   2,731,997
COMBINED BAG AND FLAT CLOTH ARTICLE
Filed Sept. 8, 1952   2 Sheets-Sheet 2
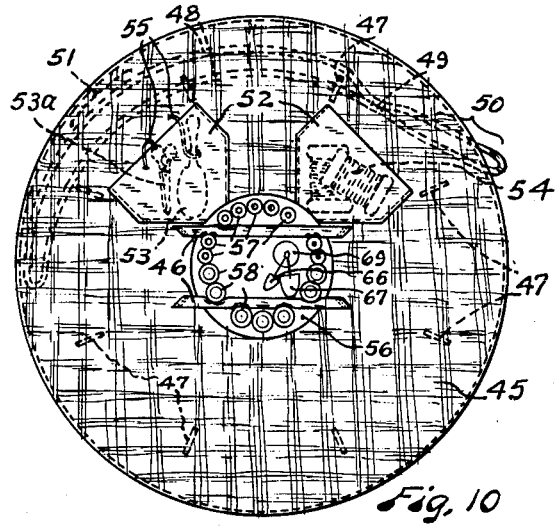
Fig. 10
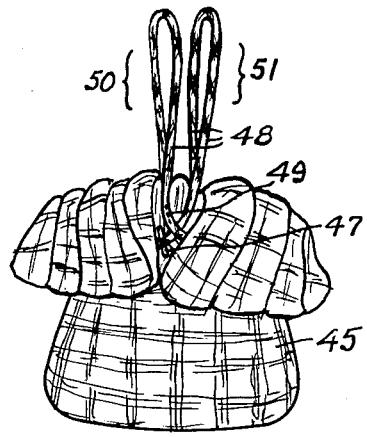
Fig. 11
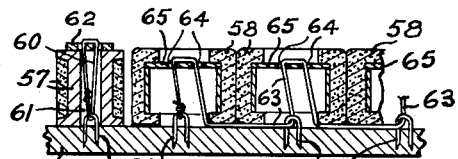
Fig. 12
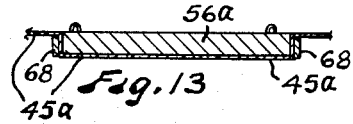
Fig. 13
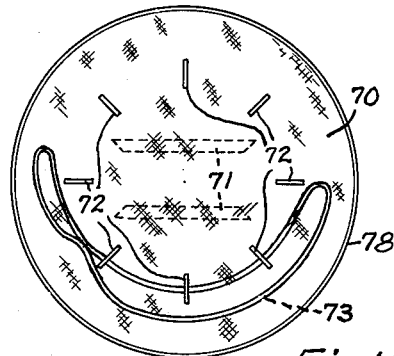
Fig. 14
Fig. 15
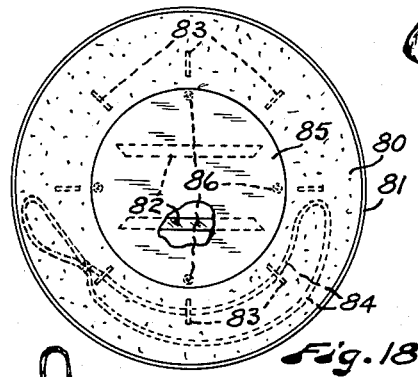
Fig. 18
Fig. 16
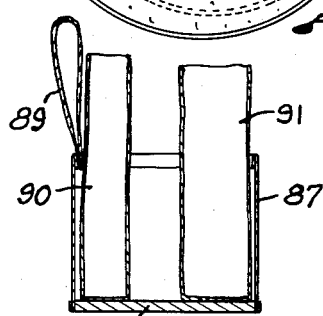
Fig. 19
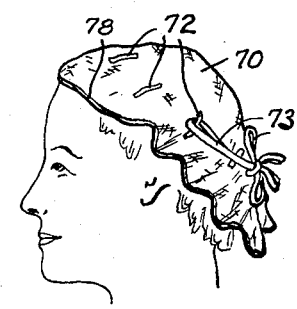
Fig. 17
INVENTORS
Esther Aldean Muth
BY Beatrice J. Mills
ATTORNEY

United States Patent Office 2,731,997
Patented Jan. 24, 1956

2,731,997

COMBINED BAG AND FLAT CLOTH ARTICLE

Esther Aldean Muth, Bellevue, and Beatrice J. Mills, Seattle, Wash.

Application September 8, 1952, Serial No. 308,326

1 Claim. (Cl. 150—11)

Our invention relates to a combined handbag and flat cloth article.

More particularly, our invention relates to a flat cloth which may be used as such and which may be pursed to form an attractive handbag.

An object of this invention is to provide an article of this nature which is capable of being put to a useful purpose when in a flat condition and which may be quickly and easily pursed to form a neat and attractive bag.

Another object is to provide a combined bag and flat cloth article which is versatile and capable of embodiment in numerous different forms for numerous different uses and which, for instance, may take the form of a combined beach bag and towel, or a combined sewing bag and sewing apron, or a combined bridesmaid's bag and hat, or a combined baby bag and baby blanket, or which may take various other forms usable in activities where there is a need for both a flat cloth article and a bag; said enumeration is by way of illustration and not limitation.

Another object is to provide a combined bag and flat cloth article in the form of a circular piece of cloth having associated therewith sling strap means by which it may be pursed to form a bag and by which it may be carried, and having means to receive and releasably hold a centrally positioned, removable plate of relatively stiff material which cooperates in forming a bottom member for the bag, and further cooperates in holding various small personal belongings and articles related to the use for which the bag is intended.

Another object of this invention is to provide a combined bag and flat cloth article which is provided with means to receive and releasably hold an inner bag in which articles may be contained.

The above mentioned general objects of this invention, together with others inherent in the same, are attained by the means illustrated in the accompanying and following drawings, the same being preferred exemplary forms of embodiment of the invention, throughout which drawings like reference numerals indicate like parts:

Fig. 10 is an inside plan view of a circular sewing bag and apron made in accordance with this invention, showing the same opened out flat as it may appear when it is to be used as a sewing apron and showing by dotted lines a combined sling strap and apron string member and sling strap receiving loops.

Fig. 11 is a perspective view of the article shown in Fig. 10 as it may appear when it is pursed and gathered to form a bag.

Fig. 12 is a view partly in section and partly in elevation showing means which may be used to fasten spools of thread, yarn and the like to a relatively stiff plate member which cooperates in forming the bottom of the bag.

Fig. 13 is a sectional view showing modified means for securing a bag and apron forming member of cloth to a plate member which serves as a bag bottom and a mounting plate for articles used in sewing and like activities.

Fig. 14 is a plan view of a circular cloth member made in accordance with this invention and used as a bridesmaid's bag and hat, parts on the under side of said circular cloth member being shown by dotted lines.

Fig. 15 is a perspective view of said bridesmaid's bag showing the same pursed and closed and illustrating how a corsage of flowers may be carried therein.

Fig. 16 is a detached perspective view showing an inner bag used in the bridesmaid's bag shown in Figs. 14 and 15, parts being broken away.

Fig. 17 illustrates a manner in which the circular cloth member shown in Fig. 14 may be used as a hat.

Fig. 18 is a plan view of a combined circular blanket and baby bag made in accordance with this invention, showing the upper side of the same as it may appear when it is opened out flat and has a circular piece of waterproof material applied thereto and showing parts by dotted lines.

Fig. 19 is a sectional view on a larger scale than Fig. 18, showing an inner bag which may be used with the cloth member shown in Fig. 18 when the circular waterproof material is detached and the cloth member is pursed to form a bag.

Figure 1:
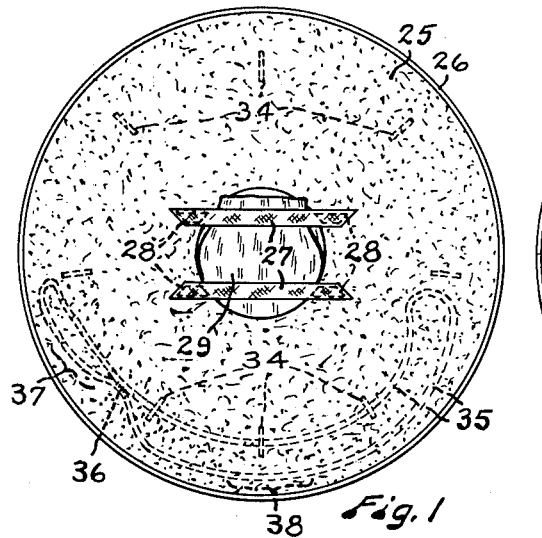
Figure 1 is an inside plan view of a circular towel and beach bag made in accordance with this invention, showing the same opened out flat and showing a closed and folded inner bag secured therein and showing by dotted lines a tie and sling strap and sling strap receiving loops therefor.

Figs. 1 to 7, inclusive, show a combined towel and beach bag comprising a circular cloth member 25 of material, such as terry cloth, suitable for use as a towel, preferably about thirty-six inches in diameter, and having a peripheral binding 26 to reinforce and strengthen the same. Two spaced apart, parallel hanger straps 27, preferably of resilient material, such as elastic or woven fabric cut on the bias, are provided on one side of the cloth member 25 at substantially equal distances on opposite sides of the center of said cloth member. The respective end portions of each hanger strap 27 are attached to the cloth member 25 as by sewing or stitching 28 and the intermediate part of each strap 27 between the end stitching 28 is loose and free from the cloth member 25 so that parts which are to be releasably and removably attached to the cloth member 25 may be inserted under the hanger straps 27 between said straps and the cloth member 25.

Figure 4:
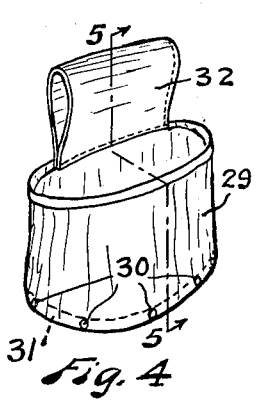
Fig. 4 is an opened up view of a detachable inner bag used in this beach bag and which cooperates in forming the bottom of the beach bag.
Figure 5:
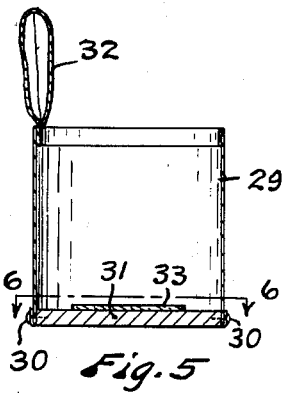
Fig. 5 is a sectional view of said inner bag taken substantially on broken line 5—5 of Fig. 4.

An inner bag 29, shown detached in Figs. 4 and 5, is adapted to be held by the hanger straps 27. Preferably the inner bag 29 is formed of waterproof pliable material, such as thin, durable plastic sheeting, made into tubular form and having one end thereof secured, by any suitable means, such as thumbtacks 30, to a bottom plate 31 of relatively stiff, nonflexible, lightweight material, such as wood. The plate 31 thus forms a bottom for the inner bag 29. The plate 31 may be circular, as indicated in Fig. 1, or it may be non-circular in outline. A receptacle 32 for small articles, such as a ladies' purse, compact, handkerchief, and the like, is formed by doubling a piece of pliable material and securing the edges of the same to the top edge of the inner bag. Preferably this purse receptacle 32 is made from the same pliable waterproof material as the inner bag 29 and is tubular in shape and is open at one end so small articles may be readily stuffed into it and removed from it. This keeps the small articles where they are readily accessible and protects them from contact with other articles in the bag.

The inner bag 29 is attached to the cloth member 25 by inserting the edges of the bottom disc 31 under the hanger straps 27 as shown in Fig. 1. The inner bag 29 may be used as a receptacle for a damp bathing suit and for any other similar articles. The receptacle 32, with purse and other articles therein, together with the top end portion of the inner bag 29, may be folded over and tucked under one of the hanger straps 27, see Fig. 1. The hanger straps thus removably attach the inner bag 29 to the center of the cloth member 25 and they also serve to hold the inner bag 29 and purse receptacle 32 closed. The disc 31 serves as a bottom for the inner bag 29 and also serves as a bottom for the outer bag when the cloth member 25 is pursed to form an outer bag as hereinafter explained. Preferably a mirror 33 is secured to the top side of the bottom disc 31 so that the disc 31 protects the mirror 33 from getting broken.

Figure 2:
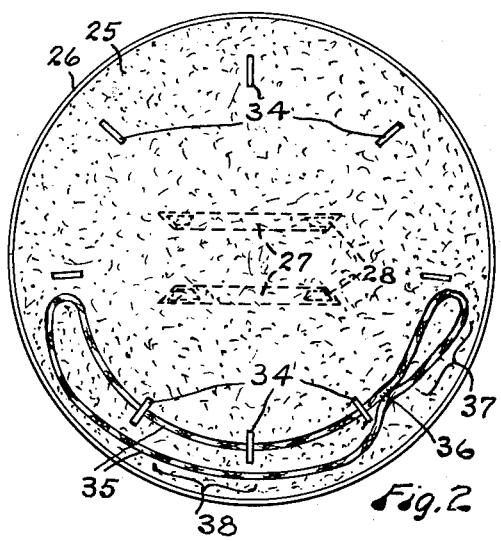
Fig. 2 is a view similar to Fig. 1 showing the outer side of the beach bag and showing by dotted lines hanger straps for receiving and holding an inner bag.

A plurality of radially disposed sling strap receiving loops 34 are secured in a circular path to the opposite side of the cloth member 25 from the hanger straps 27. Preferably the outer ends of these sling strap receiving loops 34 are spaced inwardly about four inches from the periphery of the cloth member 25. A sling strap 35, preferably of endless belt form as shown in Figs. 1 and 2, has one lap thereof passed through several of the sling strap receiving loops 34. The sling strap 35 has its two laps or side by side parts sewed or otherwise secured together at a location indicated by 36 to leave at one side of the location 36 a shorter sling strap loop 37, preferably about twelve inches long and at the other side of the location 36 a longer sling strap loop 38, preferably about twenty-six inches long. The longer sling strap loop 38 has one lap thereof threaded through and permanently engaged with preferably two or more contiguous sling strap receiving loops 34. The hanger straps 27 serve as a convenient means by which the circular cloth member may be hung up. The plate 31 serves as a bag forming bottom plate and forms a bottom for both the outer bag and the inner bag.

Figure 8:
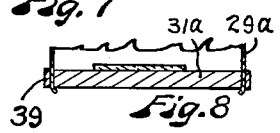
Fig. 8 is a fragmentary sectional view of an inner bag showing modified means for securing the pliable walls of the inner bag to a relatively stiff bag bottom member.

Fig. 8 shows modified means for attaching the lower end portion of an inner bag 29a to a relatively stiff bottom member 31a. This means comprises a hoop 39 which fits like an embroidery hoop over the circumferential portion of the bottom member 31a and securely clamps the marginal portion of the inner bag 29a to the bottom member 31a.

Figure 7:
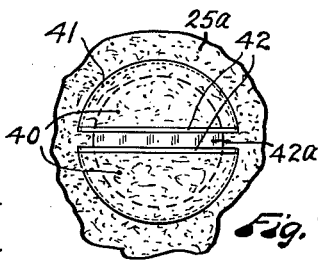
Fig. 7 is a plan view of a fragment of a towel and beach bag showing modified means for receiving and holding an inner bag which is provided with a relatively stiff bottom member.

Fig. 7 shows modified means which may be used instead of the hanger straps 27 to releasably attach an inner bag, such as the bag 29 of Figs. 1, 4 and 5, to a cloth member 25a which is similar to the cloth member 25. This modified means comprises two approximately semicircular cloth hanger pieces 40 secured by marginal stitching 41 to the central portion of the cloth member 25a. The straight edges of the hanger pieces 40 preferably have bindings or facings 42 and these straight edges are spaced apart, as shown in Fig. 7, to facilitate the insertion under and the release from the hanger pieces 40 of a relatively stiff bottom disc of an inner bag 42a like the bag 29 with disc 31 shown in Figs. 4 and 5.

Figure 3:
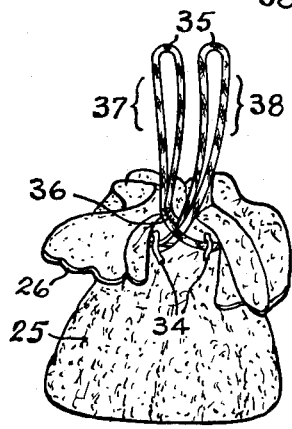
Fig. 3 is a perspective view of the towel and beach bag shown in Figs. 1 and 2 as it may appear when pursed and closed by the use of the sling strap to form a beach bag.

When the cloth member 25 and inner bag 29 and associated parts are to be used as a beach bag, the inner bag 29 is packed with desired articles and inserted under the hanger straps 27, as shown in Fig. 1. The longer loop 38 of the sling strap 35 is threaded through the remaining sling strap receiving loops 34, that is the loops 34 from which it is shown disengaged in Figs. 1 and 2, the cloth member 25 is pursed and the outer end portion of the longer loop 38 of said sling strap is passed through the portion of said longer sling strap loop 38 adjacent to the securing means 36. This leaves the shorter sling strap loop 37 and the outer end portion of the longer sling strap loop 38 protruding about equal distances from the bag, as shown in Fig. 3, so that the bag may be conveniently carried on the arm by these loops. The inner bag 29 may be readily engaged under or disengaged from the hanger straps 27 either while the cloth member 25 is spread out flat as shown in Fig. 1 or while said cloth member is pursed but not entirely closed. Access to the inner bag 29 and receptacle 32 may be readily had through the open upper end of the outer bag formed by the pursed cloth member 25. All of the articles which a bather uses at the beach may be readily carried in this beach bag.

Figure 9:
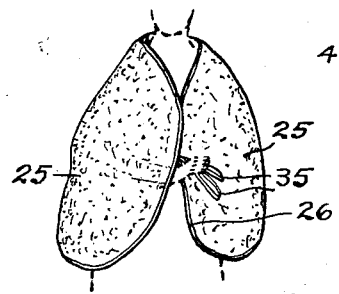
Fig. 9 is a somewhat diagrammatic view illustrating how this towel and beach bag may be worn on the shoulders as a cape.

When the inner bag 29 is removed and the cloth member 25 opened out it may be used as a towel or a pad or pillow to recline on, or it may be thrown over the shoulders as a cape as illustrated in Fig. 9. Also, when the inner bag 29 is detached, the cloth member 25 can be laundered or dry cleaned in the usual way.

A wet bathing suit or like article may be taken care of by placing it in the waterproof inner bag 29. This allows the user to place other articles in the outer bag 25 without having them in contact with the wet articles.

Figs. 10, 11 and 12 show a combined sewing apron and sewing bag made in accordance with this invention. This sewing apron and sewing bag comprises a circular cloth member 45 having hanger straps 46 and sling strap receiving loops 47, all corresponding to parts 25, 27 and 34, respectively, of Figs. 1 and 2. An endless belt type sling strap 48, similar to previously described sling strap 35, has its two laps sewed or otherwise fastened together, as by stitching 49, to form a shorter sling loop 50 and a longer sling loop 51. One lap of the longer sling loop 51 passes through and is permanently engaged with preferably at least two of the sling strap receiving loops 47 adjacent the top edge of the apron and the sling strap 48 functions as apron string means to be tied about the waist of the user and to hold the cloth member 45 when it is worn as an apron. Preferably a suitable binding is provided on the periphery of the cloth member 45. Also, preferably two pockets 52 are provided on the outer side of the cloth member 45 to receive and hold various articles used by a seamstress, such as scissors 53a, darning aid 53, darning yarn 54, and like articles. Some of these articles are attached to the cloth member 45 as by relatively long ribbons or tapes 55 so they will not become permanently separated from the apron.

Figure 6:
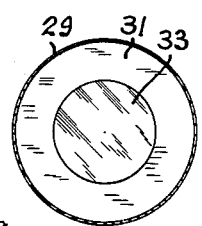
Fig. 6 is a view partly in section and partly in plan taken substantially on broken line 6—6 of Fig. 5 showing a mirror in the bottom of the inner bag.

In the form of this invention shown in Figs. 10, 11 and 12 the inner bag is dispensed with a flat mounting board 56 of stiff material, similar to the bottom plate 31 of Figs. 5 and 6, preferably about eight or nine inches across, is used as a mounting means for spools of thread 57 and spools of yarn 58 and other articles. The mounting board 56 may be circular or it may be of a non-circular outline. Said mounting board 56 is removably attached to the cloth member 45 by inserting the edge portions of the same under the hanger straps 46 as shown in Fig. 10. The spools of thread 57, see Fig. 12, may be attached to the mounting board 56 by driving staples 59 into the board 56, passing a thread like piece of rubber or elastic material 60 through each staple and through the axial bore 61 in a spool and through a button 62 which rests on the top or outer end of the spool, and tieing or securing the two ends of the elastic material together. This attaches each individual spool of thread 57 to the mounting board 56 by an elastic member 60 which will stretch and allow the spool of thread 57 to be handled freely in obtaining thread therefrom and which will snap the spool of thread back into its proper position when it is released.

The spools of yarn 58 are illustrated in Fig. 12 as being attached to the mounting board 56 by a thread like elastic connector member 63 which is common to a plurality of these spools. The elastic connector member 63 has one end portion thereof secured to a staple 59 and thence it passes out and back through two spaced apart holes 64 in the cardboard top members 65 of a spool of yarn 58, thence toward the board 56, and under the ends of two spools of yarn 58, thence through another staple 59, and out and back through two spaced apart holes 64 in the cardboard top member 65 of the next adjacent spool of yarn 58 and continues in this manner to the last spool of yarn 58 where the other end portion of the elastic member 63 is fastened to another staple. Obviously either type of elastic fastening means just hereinbefore described may be used in connection with the spools 57 and 58.

Other articles in addition to the spools 57 and 58 may be supported on the board 56, a pin cushion 69, a needle sharpener 66 and a thimble holder 67 being shown in Fig. 10.

Fig. 13 shows a modified means for securing a cloth member 45a to a disc shaped mounting board 56a. The cloth member 45a corresponds to the cloth member 45 except that the hanger straps are omitted therefrom, and the disc shaped mounting board 56a corresponds to the mounting board 56. The securing means shown in Fig. 13 consist of a hoop 68. The cloth member 45a is drawn under the mounting board 56a and the hoop 68 is then pressed onto the mounting board 56a over the cloth member 45a so as to releasably clamp and hold the cloth member 45a and the board 56a together.

The cloth member 45, when in the flat condition shown in Fig. 10, may be worn as a sewing apron or may be spread or hung on any suitable support and used while sewing, mending or darning. When the cloth member 45 is not being used as a sewing apron the sling strap 48 may be threaded through the remainder of the strap receiving loops 47 and through its own longer sling loop 51 and the cloth member 45 may be pursed to form a bag, as shown in Fig. 11. This bag is large enough to accommodate the articles which are attached to the front of the cloth member 45 and also to hold an ample supply of articles to be sewed, mended or darned, and such other small items as the user wishes to place in the bag. A person wearing the apron can get up and move around without displacing or disarranging or losing the articles attached to said apron.

Figs. 14, 15 and 16 show a combined evening or bridesmaid's bag and hat made in accordance with this invention. This bridesmaid's bag and hat comprises a circular cloth member 70 having hanger straps 71 and sling strap receiving loops 72 and a sling strap 73 all of a form hereinbefore described but which are of smaller size than the previously described corresponding parts. An inner bag 74 with non-flexible bottom plate 75 and mirror 76 and purse compartment 77 is provided for engagement with the hanger straps 71 and is used to receive articles carried by the user in a manner similar to the previously described inner bag 29. Preferably the cloth member 70 is about eighteen inches in diameter and the bottom plate 75 is from four to five inches across. The cloth member 70 is preferably made from good quality net material and has a peripheral binding 78 which may be of taffeta to provide a rather stiff border which will tend to form in loops rather than in sharp folds when the cloth member 70 is pursed. When the cloth member 70 is partially gathered by partially tightening and tying the sling strap 73 in some, but not all of the sling strap receiving loops 72, then it may be worn as a bridesmaid's hat, as illustrated in Fig. 17. When the cloth member is pursed as shown in Fig. 15 and is carried on the arm, as it may be in dancing, it provides a very convenient means for receiving and carrying, and at the same time displaying a corsage of flowers 79 with the stems inserted in the bag and the flowers nestling in the top of the bag.

Figs. 18 and 19 show a combined baby blanket and baby bag made in accordance with this invention. This blanket and bag comprises a circular blanket or cloth member 80, preferably from thirty-six to forty inches in diameter. The cloth member 80 has a peripheral binding 81 and has two hanger straps 82 and a plurality of sling strap receiving loops 83 with which a sling strap 84 engages. The parts 80 to 84, inclusive, are respectively similar to the hereinbefore described parts 25, 26, 27, 34 and 35 and are used in the same manner. The side of the cloth member 80 which is shown uppermost in Fig. 18 is the side which is innermost when the cloth member 80 is pursed to form a bag. A circular sheet 85 of waterproof material is detachably secured, as by snap fasteners 86 to this side of the cloth member 80 when said cloth member 80 is to be used as a blanket on which a baby is to be placed or in which the baby is to be wrapped. The hanger straps 82 are secured to the side of the cloth member 80 which is uppermost in Fig. 18 and, except within the boundaries of a broken away portion of the sheet 85, these hanger straps are shown dotted in Fig. 18. The sling strap receiving loops 83 and sling strap 84 are on the lowermost side of the cloth member 80 in Fig. 18 and are shown dotted.

An inner bag 87, Fig. 19, having a relatively stiff flat bottom member 88 and a receptacle 89 for small articles is provided for use with the cloth member 80. Preferably the inner bag 87 is made of waterproof material and preferably it has at least two smaller foldable waterproof bags 90 and 91 attached to the flat bottom 80 thereof. One of the smaller bags 90 or 91 will ordinarily be used to receive a baby's bottle and the other smaller bag may be used to receive damp articles and thereby prevent them from contacting other articles in the bag. The remainder of the space within the inner bag and the space in the pursed cloth member 80 around the outside of and above the inner bag 87 may be used as a receptacle for other articles to be worn or used by the baby.

The hanger straps 27 in Figs. 1 and 2 and the corresponding hanger straps in Figs. 10, 14 and 18 also serve as a convenient means by which the circular cloth members with which they are connected may be hung up when the bag forming bottom plates, such as plate 31, Fig. 5, and plate 56, Fig. 10, are detached from these hanger straps. The inner bags, such as bag 29 of Figs. 1 to 5, serve as means supporting and shaping the outer bag which is formed by pursing the circular cloth members around said inner bags.

Obviously changes may be made in the form, dimensions and arrangement of parts of this invention, without departing from the principle thereof, the above setting forth only preferred forms of embodiment.

We claim:

A combined bag and flat cloth article comprising a circular cloth member having a top and bottom side; two parallel spaced apart hanger straps of equal length each positioned the same distance as the other on opposite sides of the center of the top side of said circular cloth member and having means securing the end portions of said straps to said cloth; a plurality of sling strap receiving loops secured to the bottom side of said cloth member in a circle positioned both in spaced relation to the periphery of said cloth member and to each other thereby providing segments of said circular cloth member between said spaced apart loops for adjusting the bag volume to varying volumes to be carried; a sling strap slidably engaged within said sling strap receiving loops which strap, when pulled, purses the engaged portions; and a circular bottom plate of relatively stiff material releasably held in the center of said cloth member by said hanger straps, said plate giving uniformity of shape to the cloth member as a bag when the sling strap is in pursing position.

References Cited in the file of this patent

UNITED STATES PATENTS

| | | |
|---|---|---|
| 1,446,278 | Swenson | Feb. 20, 1923 |
| 1,504,885 | Germann | Aug. 12, 1924 |
| 1,683,678 | Kitterman | Sept. 11, 1928 |
| 1,990,372 | Cole | Feb. 5, 1935 |
| 2,479,203 | Brown | Aug. 16, 1949 |

FOREIGN PATENTS

| | | |
|---|---|---|
| 390,920 | France | Oct. 17, 1908 |
| 613,735 | France | Nov. 27, 1926 |